United States Patent
Haynes et al.

(10) Patent No.: US 7,516,285 B1
(45) Date of Patent: Apr. 7, 2009

(54) SERVER SIDE API FOR FENCING CLUSTER HOSTS VIA EXPORT ACCESS RIGHTS

(75) Inventors: Thomas Haynes, Tulsa, OK (US);
Stephen Daniel, Durham, NC (US);
Joseph Richart, Raleigh, NC (US);
Pranoop Erasani, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 287 days.

(21) Appl. No.: 11/187,649

(22) Filed: Jul. 22, 2005

(51) Int. Cl.
*G06F 12/12* (2006.01)
*G06F 12/14* (2006.01)
(52) U.S. Cl. .................................... 711/162
(58) Field of Classification Search ............... 711/162
See application file for complete search history.

(56) References Cited

U.S. PATENT DOCUMENTS

| | | | |
|---|---|---|---|
| 4,156,907 A | 5/1979 | Rawlings et al. | |
| 4,399,503 A | 8/1983 | Hawley | |
| 4,598,357 A | 7/1986 | Swenson et al. | |
| 4,688,221 A | 8/1987 | Nakamura et al. | |
| 4,698,808 A | 10/1987 | Ishii | |
| 4,761,785 A | 8/1988 | Clark et al. | |
| 4,805,090 A | 2/1989 | Coogan | |
| 4,837,675 A | 6/1989 | Bean et al. | |
| 4,864,497 A | 9/1989 | Lowry et al. | |
| 4,896,259 A | 1/1990 | Jacobs et al. | |
| 4,899,342 A | 2/1990 | Potter et al. | |
| 4,989,206 A | 1/1991 | Dunphy, Jr. et al. | |
| 5,124,987 A | 6/1992 | Milligan et al. | |
| RE34,100 E | 10/1992 | Hartness | |
| 5,155,835 A | 10/1992 | Belsan | |
| 5,426,747 A | 6/1995 | Weinreb et al. | |
| 5,568,629 A | 10/1996 | Gentry et al. | |
| 5,581,724 A | 12/1996 | Belsan et al. | |
| 5,819,292 A | 10/1998 | Hitz et al. | |
| 5,960,169 A | 9/1999 | Styczinski | |
| 6,065,037 A * | 5/2000 | Hitz et al. ............... | 709/200 |
| 6,516,380 B2 | 2/2003 | Kenchammana-Hoskote et al. | |
| 6,636,879 B1 | 10/2003 | Doucette et al. | |
| 6,643,654 B1 | 11/2003 | Patel et al. | |

(Continued)

OTHER PUBLICATIONS

Administration Guide Found at http://www.openafs.org/pages/doc/AdminGuide/auagd010.htm, visited on Mar. 2, 2005.

(Continued)

*Primary Examiner*—Hyung S Sough
*Assistant Examiner*—Hamdy S Ahmed
(74) *Attorney, Agent, or Firm*—Cesari and McKenna LLP

(57) ABSTRACT

A method and system performs fencing techniques in a host cluster storage environment. A fencing application program interface resides in one or more storage systems. When a message is received by said storage system from a cluster member, the storage system in turn modifies the NFS export lists of one or more storage systems to restrict further access by the failed cluster node to otherwise fence the failed cluster node off from that storage system or from certain directories within that storage system. Prior to said access permission rights being changed, NFS operations are locked and drained, NFS locks are removed after which the export lists are modified. Once the fencing operations are performed, the NFS operations are served again by the storage system.

24 Claims, 7 Drawing Sheets

U.S. PATENT DOCUMENTS

| | | | |
|---|---|---|---|
| 7,194,579 | B2 | 3/2007 | Robinson et al. |
| 7,194,597 | B2 | 3/2007 | Willis et al. |
| 2003/0079100 | A1* | 4/2003 | Williams et al. ............ 711/165 |
| 2004/0030668 | A1 | 2/2004 | Pawlowski |
| 2004/0268068 | A1 | 12/2004 | Curran et al. |
| 2005/0246401 | A1 | 11/2005 | Edwards et al. |
| 2005/0283641 | A1* | 12/2005 | Clark et al. .................... 714/4 |
| 2007/0088702 | A1 | 4/2007 | Fridella et al. |

OTHER PUBLICATIONS

Basilico, et al., *Error Correction System Using "Shadow Memory,"* IBM Technical Disclosure Bulletin, May 1984, pp. 5792-5793.

Bitton, Dina, *Disk Shadowing*, Proceedings of the 14th VLDB Conference, LA, CA (1988).

Blasgen, M.W. et al., *System R:An architectural Overview*,Reprinted from IBM Systems Journal vol. 20, No. 1, 1981©1981, 1999.

Borenstein, Nathaniel S., *CMU's Andrew project a retrospective*, Communications of ACM, (39)12, Dec. 1996.

Brown, Mark R. et al., *The Alpine file system*, ACM Transactions of Computing Systems, 3(4):261--293, Nov. 1985.

Chen, Peter M., et al., *An Evaluation of Redundant Arrays of Disks Using an Amdahl* 5890 Performance Evaluation, pp. 74-85, 1990.

Chutani, Sailesh, et al., *The Episode file system*, In Proceedings of the USENIX Winter 1992.

Clark, B.E., et al., *Appliction System /400 Performance Characteristics*, IBM System Journal, 28(3): 407-423, 1989.

Data Sheet for the Check Point Software Technologies product Flood-Gate-1 (1997).

Dibble, Peter C., et al., *Beyond Striping: The Bridge Multiprocessor File System*, Computer Science Department, University of Rochester, Aug. 11, 1989.

Douglis, Fred, et al., *A comparison of two distributed systems: Amoeba and Sprite* - Computing Systems, 4(4), Fall 1991, pp. 353-385 ?{copy of article I have has no date or cite}.

Gait, Jason, *Phoenix: A Safe In-Memory File System*. Communications of the ACM, 33(1):81--86, Jan. 1990.

Hartman, John H. et al., *Performance Measurements of Multiprocessor Sprite Kernel*, Proceedings of the USENIX Conference, 1990.

Hitz Dave et al., *File System Design for an NFS File Server Appliance*, Technical Report 3002, Rev. C395, presented Jan. 19, 1994.

Hitz, David, et al., *System and Method for Enabling a Storage System to Support Multiple Volume Formats Simultaneously*, Provisional U.S. Appl. No. 60/652,626. Feb. 14, 2005.

Howard, John H, et al. *Scale and Performance in a Distributed File System*, Carnegie Mellon University, CMU-ITC-87-068, Aug. 5, 1987.

Howard, John, H. et al., *Scale and performance in a distributed file system*, ACM Trans. Computer.System., 6(1), Feb. 1988 pp. 51-81.

Howard, John H., *An Overview of the Andrew File System*, Carnegie Mellon University, CMU-ITC-88-062.

*The IBM System*/38, Chapter 8, pp. 137-115.

Isomaki, Markus, *Differentiated Service for the Internet*, Department of Technical Physics and Mathematics, May 9, 1998.

Kazar, Michael L., et al., *Decorum File System Architectural Overview*, USENIX Summer Conference, Anaheim, California, 1990.

Lomet, David., et al.,*The performance of a multiversion access method*, ACM SIGMOD International Conference on Management of Data, 19:353-363.

Lorie, Raymond, A, *Physical integrity in a large segmented database*, ACM Trans. Database Systems, (2)1: 91-104, Mar. 1977.

Lorie, RA, *Shadow Page Mechanism*, IBM Technical Disclosure Bulletin, Jun. 1986, pp. 340-342.

McKusick, Marshall Kirk, et al., *A Fast File System for UNIX*, Computer Science Division, Department of Electrical Engineering and Computer Science, Univ. of CA, Berkely, Feb. 18, 1994.

Miller, Ethan L., et al., *RAMA:A File System for Massively Parallel Computers*, 12th IEEE Symposium on Mass Storage Systems, Monterey CA, Apr. 1993, pp. 163-168.

Moons, Herman et al., *Location-Independent Object Invocation in Open Distributed Systems*, Autumn 1991 EurOpen Technical Conference and Exhibition, pp. 287-300 (Sep. 16-20, 1991).

Morris, James H., et al, *Andrew: A Distributed Personal Computing Environment*, Comm. of the ACM, vol. 29, Mar. 1986, pp. 184-201.

Mullender, Sape J., et al., *A distributed file service based on optimistic concurrency control*, ACM Symposium on Operating System Principles (Orcas Island, Washington). Published as Operating System Review, 19(5):51-62, Dec. 1985

Muller, Keith, et al., *A High Performance Multi-Structured File System Design*, In Proceedings of the 13th ACM Symposium on Operating Systems Principles, Oct. 1991, pp. 56--67.

Moons, Herman et al., *Location-Independent Object Invocation in Open Distributed Systems*, Autumn 1991 EurOpen Technical Conference and Exhibition, pp. 287-300 (sep. 16-20, 1991).

Ousterhout, John K., et al., *The Sprite Network Operating System*, Computer Science Division, Department of Electrical Engineering and Computer Sciences, Univ. of CA, Berkley, nov. 19, 1987.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Ousterhout, John, *Why Aren't Operating Systems Getting Faster as Fast as Hardware?*, Digital WRL Technical Note TN-11, Oct. 1989.

Ousterhout, John, *A Brief Retrospective On The Sprite Network Operating System*, found at http://www.cs.berkeley.edu/projects/sprite/retrospective.html, visited on Mar. 11, 2005.

Patterson, D., et al., *A Case for Redundant Arrays of Inexpensive Disks (RAID)* Technical Report, CSD-87-391, Computer Science Division, Electrical Engineering and Computer Sciences, University of California at Berkeley (1987).

Patterson, D., et al., *A Case for Redundant Arrays of Inexpensive Disks (RAID)* SIGMOD International Conference on Management of Data, Chicago, IL, USA, Jun. 1-3, 1988, SIGMOD Record (17)3:109-116 (Sep. 1988).

Peterson, Zachary Nathaniel Joseph, *Data Placement for Copy-on-Write Using Virtual Contiguity,*, University of CA, Santa Cruz, Master of Science in Computer Science Thesis, Sep. 2002.

Quinlan, Sean, *A Cached WORM File System*, Software-Practice and Experience, 21(12):1289-1299 (1991).

Redundant Array of Independent Disks, from Wikipedia, the free encyclopedia, found at http://en.wikipedia.org/wiki/RAID, visited on Mar. 9, 2005.

Rosenberg, J., et al., *Stability in a Persistent Store Based on a Large Virtual Memory*, In Security and Persistence, Rosenber, J. & Keedy, J.L. (ed), Springer-Verlag (1990) pp. 229-245.

Rosenblum, Mendel, et al., *The LFS Storage Manager*, Computer Science Division, Electrical Engin. And Computer Sciences, Univ. of CA, presented at Summer '90 USENIX Technical Conference, Anaheim, CA Jun. 1990.

Rosenblum, Mendel, et al., The *Design and Implementation of a Log-Structured File System* Jul. 24, 1991 pp. 1-15.

Rosenblum, Mendel, et al., *The Design and Implementation of a Log-Structured File System*, , In Proceedings of ACM Transactions on Computer Systems, (10)1:26-52, Feb. 1992.

Sandberg, Russel et al., *Design and implementation of the Sun Network Filesystem*. In Proc. Summer 1985 USENIX Conf., pp. 119-130, Portland OR (USA), Jun. 1985.

Santry, Douglas S., et al., *Deciding When to Forget in the Elephant File System*, Operating Systems Review, 34(5), (Dec. 1999) pp. 110-123.

Satyanarayanan, M., et al. *The ITC Distributed File System: Principles and Design*, In Proceedings of the 10th ACM Symposium on Operating Systems Principles, (19)5:56-67, Dec. 1985.

Satyanarayanan,.M.. *A survey of distributed file-systems*. Annual Review of Computing Science, 4(73--104), 1998.

Satyanarayanan, M., et al, *Coda: A highly available file system for a distrbuted workstation environment* Carnegie Mellon University, CMU-ITC.

Satyanarayanan, M., et al, *Coda: A highly available file system for a distributed workstation environment*. IEEE Transactions on Computers, 39(4):447-459, 1990.

Satyanarayanan, Mahadev, *Scalable, Secure, and Highly Available Distributed File Access*, Computer May 1990: 9-21.

Sidebotham, Bob, *Volumes: The Andrew File System Data Structuring Primitive*, EEUG Conference Proceedings, Manchester, UK, Autumn 1986.

User Guide found at http://www.openafs.org/pages/doc/UserGuide/auusg004.htm, visited on Mar. 2, 2005.

Welch, Brent B., et al., *Pseudo Devices: User-Level Extensions to the Sprite File System*, Computer Science Division, Department of Electrical Engineering and Computer Science, Univ. of CA, Berkley, Apr. 1988.

Welch, Brent B., et al., *Pseudo-File-Systems*, Computer Science Division, Department of Electrical Engineering and Computer Sciences, Univ. of CA, Berkley, Oct. 1989.

Wittle, Mark, et al., *LADDIS: The next generation in NFS file server benchmarking*, USENIX Association Conference Proceedings, Apr. 1993.

\* cited by examiner

SERVER SIDE API FOR FENCING CLUSTER HOSTS VIA EXPORT ACCESS RIGHTS

BACKGROUND OF THE INVENTION

1. Field of the Invention

This invention relates to data storage systems, and more particularly, to failure fencing in networked data storage systems.

2. Background Information

A storage system is a computer that provides storage service relating to the organization of information on writable persistent storage devices, such as memories, tapes or disks. The storage system is commonly deployed within a storage area network (SAN) or a networked storage environment. When used within a networked environment, the storage system may be embodied as a storage system including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

In the client/server model, the client may comprise an application executing on a computer that "connects" to a storage system over a computer network, such as a point-to-point link, shared local area network, wide area network or virtual private network implemented over a public network, such as the Internet. NAS systems generally utilize file-based access protocols; therefore, each client may request the services of the storage system by issuing file system protocol messages (in the form of packets) to the file system over the network. By supporting a plurality of file system protocols, such as the conventional Common Internet File System (CIFS), the Network File System (NFS) and the Direct Access File System (DAFS) protocols, the utility of the storage system may be enhanced for networking clients.

A SAN is a high-speed network that enables establishment of direct connections between a storage system and its storage devices. The SAN may thus be viewed as an extension to a storage bus and, as such, an operating system of the storage system (a storage operating system, as hereinafter defined) enables access to stored information using block-based access protocols over the "extended bus." In this context, the extended bus is typically embodied as Fibre Channel (FC) or Ethernet media (i.e., network) adapted to operate with block access protocols, such as Small Computer Systems Interface (SCSI) protocol encapsulation over FC or TCP/IP/Ethernet.

A SAN arrangement or deployment allows decoupling of storage from the storage system, such as an application server, and placing of that storage on a network. However, the SAN storage system typically manages specifically assigned storage resources. Although storage can be grouped (or pooled) into zones (e.g., through conventional logical unit number or "lun" zoning, masking and management techniques), the storage devices are still pre-assigned by a user that has administrative privileges (e.g., a storage system administrator, as defined hereinafter) to the storage system.

Thus, the storage system, as used herein, may operate in any type of configuration including a NAS arrangement, a SAN arrangement, or a hybrid storage system that incorporates both NAS and SAN aspects of storage.

Access to disks by the storage system is governed by an associated "storage operating system," which generally refers to the computer-executable code operable on a storage system that manages data access, and may implement file system semantics. In this sense, the NetApp® Data ONTAP™ operating system available from Network Appliance, Inc., of Sunnyvale, Calif. that implements the Write Anywhere File Layout (WAFL™) file system is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

In many high availability server environments, clients requesting services from applications whose data is stored on a storage system are typically served by coupled server nodes that are clustered into one or more groups. Examples of these node groups are Unix®-based host-clustering products. The nodes typically share access to the data stored on the storage system from a direct access storage/storage area network (DAS/SAN). Typically, there is a communication link configured to transport signals, such as a heartbeat, between nodes such that during normal operations, each node has notice that the other nodes are in operation.

In the case of a two-node cluster, for example, the absence of a heartbeat signal indicates to a node that there has been a failure of some kind. However, if both nodes are still in normal operating condition, the absent heartbeat signal may be the result of interconnect failure. In that case, the nodes are not in communication with one another and, typically, only one node should be allowed access to the shared storage system. In addition, a node that is not properly functioning may need to have its access to the data of the storage system restricted.

But, in a networked storage device, access to a storage system is typically through a conventional file system protocol, such as the network file system (NFS) protocol. Thus, any techniques that are used to restrict access to data with respect to a NAS device would need to incorporate the NFS protocol. Moreover, the NFS protocol does not support SCSI reservations, and thus prior techniques which relied on SCSI reservations would not be suitable for an environment in which access to the storage system is through NFS. Thus, a network accessed storage system does not fit into this traditionally disk-based host cluster model.

There remains a need, therefore, for a host cluster environment that includes failure fencing but that can support NFS data access from a network clustered environment that is interfaced with the storage system.

There remains a further need for performing fencing operations without requiring a traditional SCSI-based reservation mechanism when a cluster does not predominantly share data from a directly attached disk, but instead functions in a networked storage environment.

SUMMARY OF THE INVENTION

The present invention overcomes the disadvantages of the prior art by providing a clustered storage environment that includes a fencing mechanism that supports a file system protocol, such as the network file system (NFS) protocol, as a shared data source in the clustered environment. A plurality of nodes interconnected as a cluster is configured to utilize the storage services provided by an associated networked storage system. Each node in the cluster is an identically configured redundant node that may be utilized in the case of failover or for load balancing with respect to the other nodes in the cluster. The nodes are hereinafter referred to as a "cluster members." Each cluster member is supervised and controlled by cluster software executing on one or more processors in the cluster member. In some instances, cluster membership is also controlled by an associated quorum device. The arrangement of the nodes in the cluster, and the cluster software executing on each of the nodes, as well as the quorum device, if any, are hereinafter collectively referred to as the "cluster infrastructure."

The clusters are coupled with the associated storage system through an appropriate network such as a wide area network, a virtual private network implemented over a public network (Internet), or a shared local area network. For a networked environment, the clients are typically configured to access information stored on the storage system as directories and files. The cluster members typically communicate with the storage system over a network by exchanging discreet frames or packets of data according to predefined protocols, such as the NFS over Transmission Control Protocol/Internet Protocol (TCP/IP).

In accordance with illustrative embodiments of the invention, a Server Application Program Interface ("Server API") provides an interface between the cluster infrastructure and the export module of the storage system to enable changes to access rights of certain exports of the storage system when the cluster infrastructure determines that a cluster member is to be fenced from a particular export of the storage system. More specifically, an NFS server of the storage system has associated therewith certain export lists that provide rules relating to access to the NFS data served by the storage system. An access rule provides the authentication level required for read access, read/write access and/or administrative (root) access by a client as identified by a particular identification type, such as a network address. For example, when processing an incoming data access request directed to the storage system, a search is performed through an ordered export list of rules in a rule set to find a match between the client and a specific rule in the export list. If no match is found, then the data access request is denied. If a match is found, then the matching rule indicates the permission rights that the particular client has, i.e., read-write access, or read-only access to the specified data container, which may be a file, a directory or a storage system. Individual cluster members that serve that client will typically have the same access rights initially as the client as a whole. However, using the fencing technique of the present invention, individual cluster members can be fenced off from the exports, but other cluster members interfaced with that client may still have access to the data.

According to illustrative embodiments of the present invention, when a change in cluster membership occurs, or is mandated for any one of a variety of reasons by the cluster infrastructure, a host API message is issued by a fencing program executing on a cluster member not affected by the change in cluster membership (i.e., the "surviving" cluster member). Details of a host API interface and API messages issued thereby are set forth in commonly owned U.S. patent application Ser. No. 11/187,781, of Erasani et al., for a CLIENT FAILURE FENCING MECHANISM FOR FENCING NETWORK FILE SYSTEM DATA IN A HOST-CLUSTER ENVIRONMENT, filed on even date herewith, which is hereby incorporated by reference herein as though fully set forth in its entirety.

The host API message notifies the Server API of the storage system that a modification must be made in one of the export lists. This modification is to be made so that a target cluster member, for example, cannot write to any of the disks in the storage system, thereby fencing off that member from that data. For example, the Server API of the storage system receives the host API message from a cluster member that a particular target cluster member is to be fenced. The message is forwarded to the Export Module of the NFS server. The Server API instructs the Export Module to change the read-write access permission right of a particular cluster member to a read only access as to one or more given exports to fence that cluster member from certain exports. In other instances, read-write permission is restored in an unfencing operation. A single host API message can be used for all requests for a particular storage system identified with the same user name and password. As a result, the multiple requests can be combined for fencing and unfencing operations and these operations do not have to be performed separately.

When a fencing operation is instituted in the storage system, the NFS server of the storage operating system is suspended. Thus, NFS operations (read-write requests, file requests, etc.,) are locked. All pending NFS operations are completed before the new access permissions take effect. The NFS file locks held by the fenced host are removed when the NFS server is suspended. This allows the fencing operations to be atomic. After the permission rights are changed, the suspended NFS server is restarted in a fencing operation. However, when an unfencing operation is performed, there may be a necessity to recover locks.

The fenced cluster member may continue to have read access so that when it comes back online, the fenced member can read relevant storage devices in the storage system to bring the node up to date with the current state of the data in the storage system. After the fencing is no longer needed, i.e., when the node again becomes a member of the cluster (either through administrative action or the cluster framework implementation), an "unfence" operation can be performed to allow access to the relevant data.

BRIEF DESCRIPTION OF THE DRAWINGS

The above and further advantages of the invention may be better understood by reference to the following description in conjunction with the accompanying drawings, in which like reference numerals indicate identical or functionally similar elements.

DETAILED DESCRIPTION OF AN ILLUSTRATIVE EMBODIMENT

A. Cluster Environment

Figure 1:
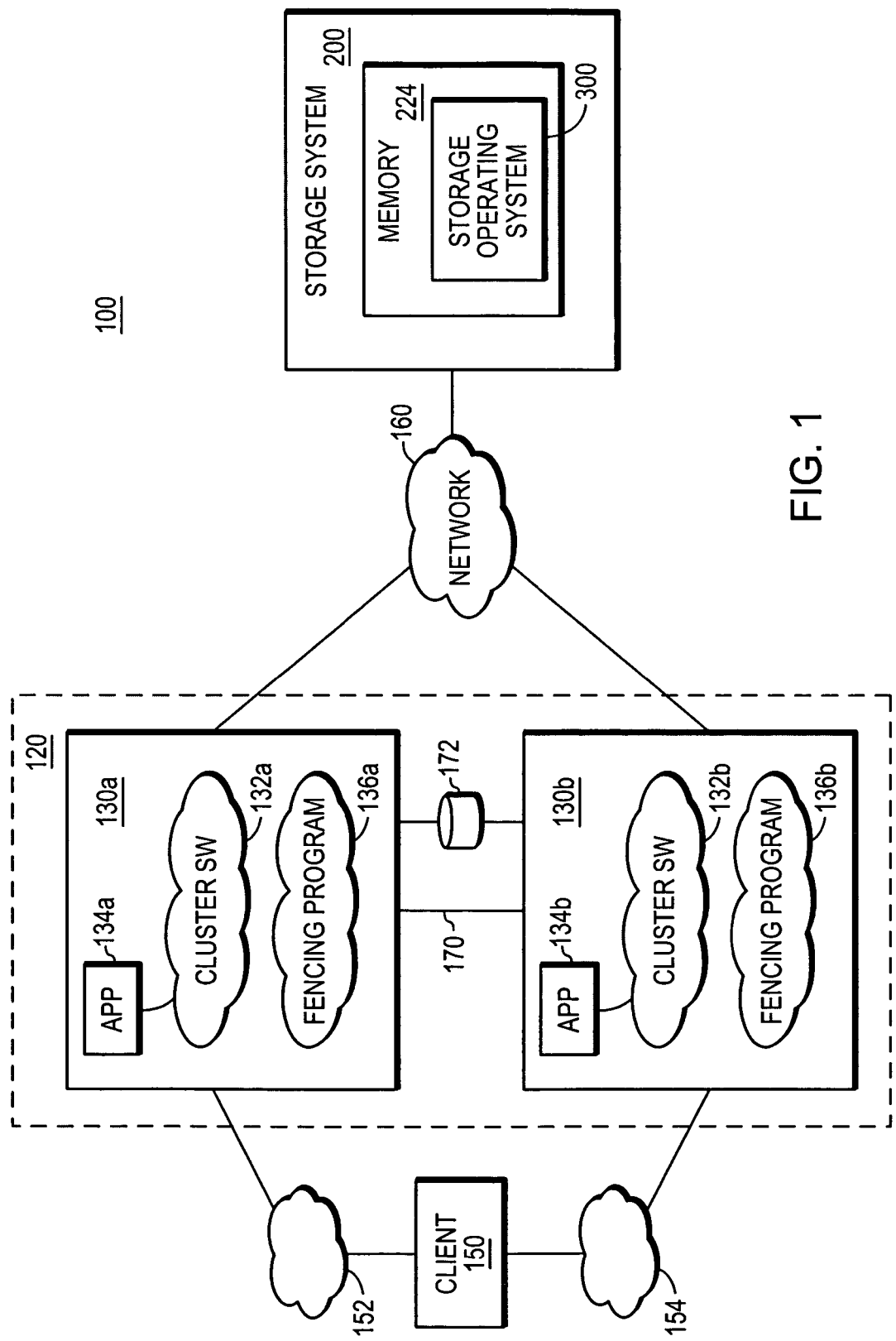
FIG. 1 is a schematic block diagram of a storage environment, which includes an interconnected set of cluster members coupled by a network to a storage system in which illustrative embodiments of the present invention may be advantageously employed.

FIG. 1 is a schematic block diagram of a storage environment 100 that includes a cluster 120 having cluster members 130a and 130b, each of which is an identically configured redundant node that utilizes the storage services of an associated storage system 200. For purposes of clarity of illustration, the cluster 120 is depicted as a two-node cluster, however, the architecture of the environment 100 can vary from that shown while remaining within the scope of the present invention.

Cluster members 130a and 130b comprise various functional components that cooperate to provide data from storage devices of the storage system 200 to a client 150. The cluster member 130a includes a plurality of ports that couple the member to the client 150 over a computer network 152. Similarly, the cluster member 130b includes a plurality of ports that couple that member with the client 150 over a computer network 154. In addition, each cluster member 130, for example, has a second set of ports that connect the cluster member to the storage system 200 by way of a network 160. The cluster members 130a and 130b, in the illustrative example, communicate over the network 160 using a Transmission Control Protocol/Internet Protocol (TCP/IP). It should be understood that although networks 152, 154 and 160 are depicted in FIG. 1 as individual networks, these networks may in fact comprise a single network or any number of multiple networks, and the cluster members 130a and 130b can be interfaced with one or more of such networks in a variety of configurations while remaining within the scope of the present invention.

In addition to the ports which couple the cluster member 130a to the client 150 and to the network 160, the cluster member 130a also has a number of program modules executing thereon. For example, cluster software 132a performs overall configuration, supervision and control of the operation of the cluster member 130a. An application 134a running on the cluster member 130a communicates with the cluster software to perform the specific function of the application running on the cluster member 130a. This application 134a may be, for example, an Oracle® database application. In accordance with an illustrative embodiment of the invention, the cluster member 130a also includes a fencing program 136a, as described in further detail hereinafter.

Similarly, cluster member 130b includes cluster software 132b which is in communication with an application program 134b. A fencing program 136b, in accordance with the invention, executes on the cluster member 130b. The cluster members 130a and 130b are illustratively coupled by a cluster interconnect 170. In addition, each of the cluster members 130a and 130b may optionally be directly attached to a quorum disk 172 which provides quorum services for the cluster 120 such that if a cluster member detects the absence of a notification, such as a heartbeat, from another cluster member, that cluster member will attempt to assert a claim by, for example, asserting a SCSI-3 persistent reservation, on the quorum device in order to have continued access to the storage device, as described previously herein.

B. Storage System

Figure 2:
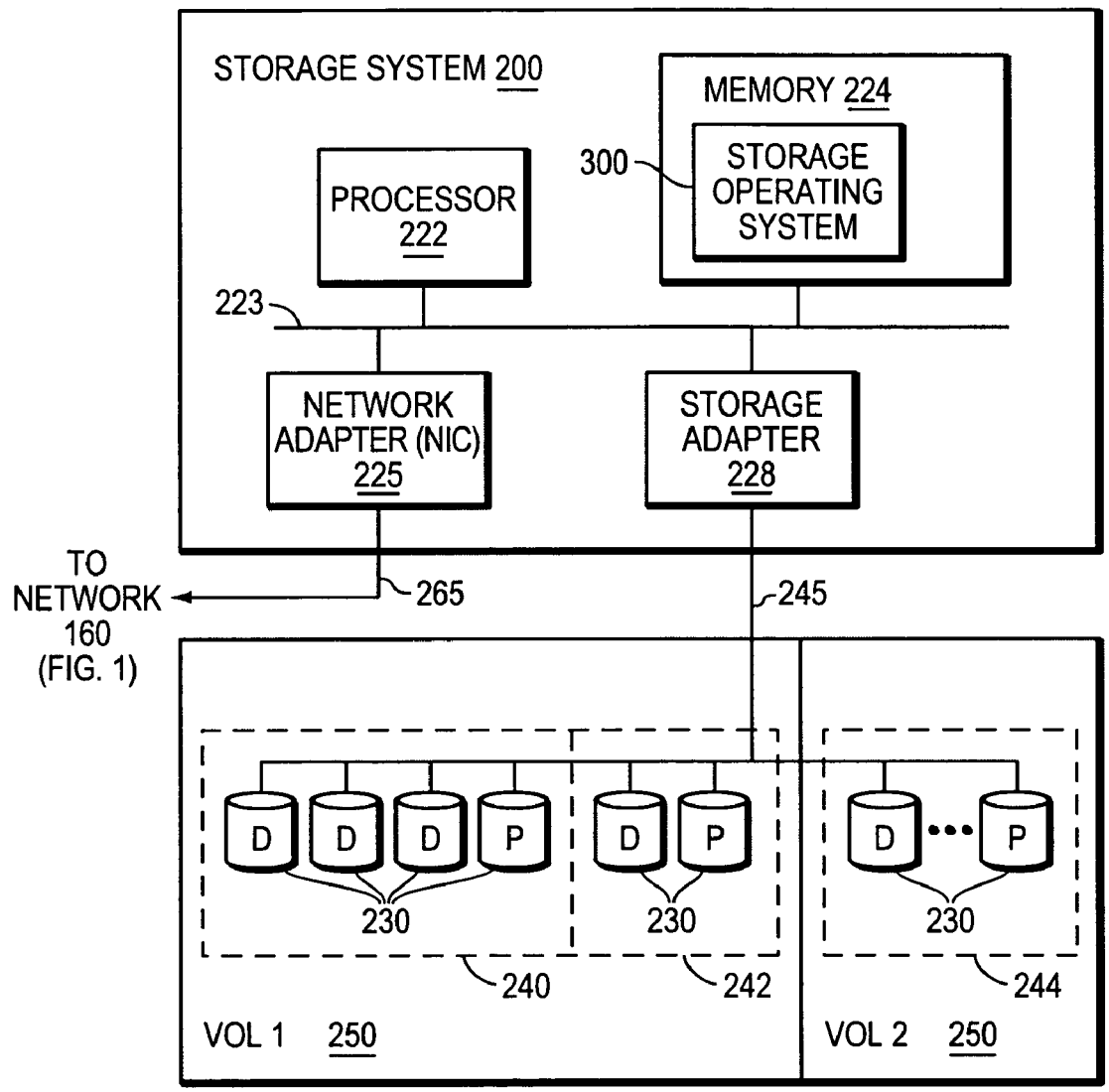
FIG. 2 is a schematic block diagram of the storage system that may be advantageously used in accordance with an embodiment of the present invention.

FIG. 2 is a more detailed schematic block diagram of the storage system 200 that is connected to the network 160 in order to serve data with respect to the cluster 120. The storage system 200 comprises one or more processors 222, a memory 224, a network adapter 225 and a storage adapter 228 interconnected by a system bus 223. The network adapter 225 comprises a plurality of ports adapted to couple the storage system 200 to the cluster 120 by way of the network 160. The storage system 200 also includes a storage operating system 300 that includes a virtualization system including a file system to logically organize the information as a hierarchical structure of named directory, file and virtual disk (vdisk) storage objects on disk drives 230. An example of a storage system that may be advantageously used with the present invention is described in co-pending, commonly assigned U.S. patent application Ser. No. 10/215,917, filed on Aug. 9, 2002, entitled A MULTIPROTOCOL STORAGE APPLIANCE THAT PROVIDES INTEGRATED SUPPORT FOR FILE AND BLOCK ACCESS PROTOCOLS, which application is hereby incorporated by reference as though fully set forth herein.

In the illustrative embodiment, the memory 224 comprises storage locations that are addressable by the processor and adapters for storing software program code and data structures, the latter containing information passed between disk drives and the network during normal runtime operations. The processor and adapters may comprise processing elements and/or logic circuitry configured to execute the software code and manipulate the data structures. The storage operating systems 200, portions of which are typically resident in memory and executed by the processing elements, functionally organizes the storage system by, inter alia, invoking storage operations in support of the storage service implemented by the system. It will be apparent to those skilled in the art that other processing and memory means, including various computer readable media, may be used for storing and executing program instructions pertaining to the invention described herein.

Whereas clients of a NAS-based network environment have a storage viewpoint of files, the clients of a SAN-based network environment have a storage viewpoint of blocks or disks. To that end, the storage system 200 presents (exports) disks to SAN clients through the creation of logical unit numbers (luns) or vdisk objects. A vdisk object (hereinafter "vdisk") is a special file type that is implemented by the virtualization system and translated into an emulated disk as viewed by the SAN clients. The storage system 200 thereafter makes these emulated disks accessible to SAN clients.

The network adapter 225 couples the storage system 200 to a cluster, such as the cluster 120, over point-to-point links, wide area networks, virtual private networks implemented over a public network (Internet) or a shared local area network, as illustrated by the arrow 265. For a networked environment, the clients are configured to access information stored on the storage system 200 as files. The cluster 120 communicates with the storage system over network 160 by exchanging discrete frames or packets of data according to pre-defined protocols, such as NFS over the TCP/IP protocol.

The cluster 120 may include general-purpose computers configured to execute applications over a variety of operating systems, including the UNIX® and Microsoft® Windows™ operating systems. Client systems generally utilize file-based access protocols when accessing information (in the form of files and directories) over a networked network. Therefore, each client 150 may request the services of the storage system 200 by issuing file access protocol messages (in the form of packets) to the system over the network 160. For example, a cluster member 130a running the Windows operating system may communicate with the storage system 200 using the Common Internet File System (CIFS) protocol over TCP/IP. On the other hand, a cluster member 130b running the UNIX operating system may communicate with the storage system using either the Network File System (NFS) protocol over TCP/IP or the Direct Access File System (DAFS) protocol over a virtual interface (VI) transport in accordance with a remote DMA (RDMA) protocol over TCP/IP. It will be apparent to those skilled in the art that other clients running other types of operating systems may also communicate with the storage system using other file access protocols.

The storage adapter 228 cooperates with the storage operating system 300 executing on the storage system 200 to access information requested by the clients. The information may be stored in the disk drives 230 or other similar media adapted to store information. The storage adapter includes I/O interface circuitry that couples to the disks over an I/O interconnect arrangement, such as a conventional high-performance, FC serial link topology. The information is retrieved by the storage adapter and, if necessary, processed by the processor 222 (or the adapter 228 itself) prior to being forwarded over the system bus 223 to the network adapters 225 where the information is formatted into packets or messages and returned to the clients.

Storage of information on the storage system 200 is preferably implemented as one or more storage volumes (e.g., VOL1-2 250) that comprise a cluster of physical storage disk drives 230, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

Specifically, each volume 250 is constructed from an array of physical disk drives 230 that are organized as RAID groups 240, 242, and 244. The physical disks of each RAID group include those disks configured to store striped data (D) and those configured to store parity (P) for the data, in accordance with an illustrative RAID 4 level configuration. However, other RAID level configurations (e.g. RAID 5) are also contemplated. In the illustrative embodiment, a minimum of one parity disk and one data disk may be employed. However, a typical implementation may include three data and one parity disk per RAID group and at least one RAID group per volume.

To facilitate access to the disk drives 230, the storage operating system 300 implements a write-anywhere file system that cooperates with virtualization modules to provide a system that "virtualizes" the storage space provided by the disk drives 230. The file system logically organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system, which is described more fully with reference to FIG. 3, allows the file system to further logically organize information as a hierarchical structure of named vdisks on the disks, thereby providing an integrated NAS and SAN appliance approach to storage by enabling file-based (NAS) access to the files and directories, while further enabling block-based (SAN) access to the vdisks on a file-based storage platform.

As noted, in the illustrative embodiment, the storage operating system is preferably the NetApp® Data ONTAP™ operating system that implements a Write Anywhere File Layout (WAFL®) file system. However, it is expressly contemplated that any appropriate storage operating system, including a write in-place file system, may be enhanced for use in accordance with the inventive principles described herein. As such, where the term "WAFL" is employed, it should be taken broadly to refer to any storage operating system that is otherwise adaptable to the teachings of this invention.

As used herein, the term "storage operating system" generally refers to the computer-executable code operable on a computer that manages data access and may, in the case of a storage system, implement data access semantics, such as the Data ONTAP storage operating system. The storage operating system can also be implemented as an application program operating over a general-purpose operating system, such as UNIX® or Windows NT®, or as a general-purpose operating system with configurable functionality, which is configured for storage applications as described herein.

In addition, it will be understood by those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or system.

C. Storage Operating System

Figure 3:
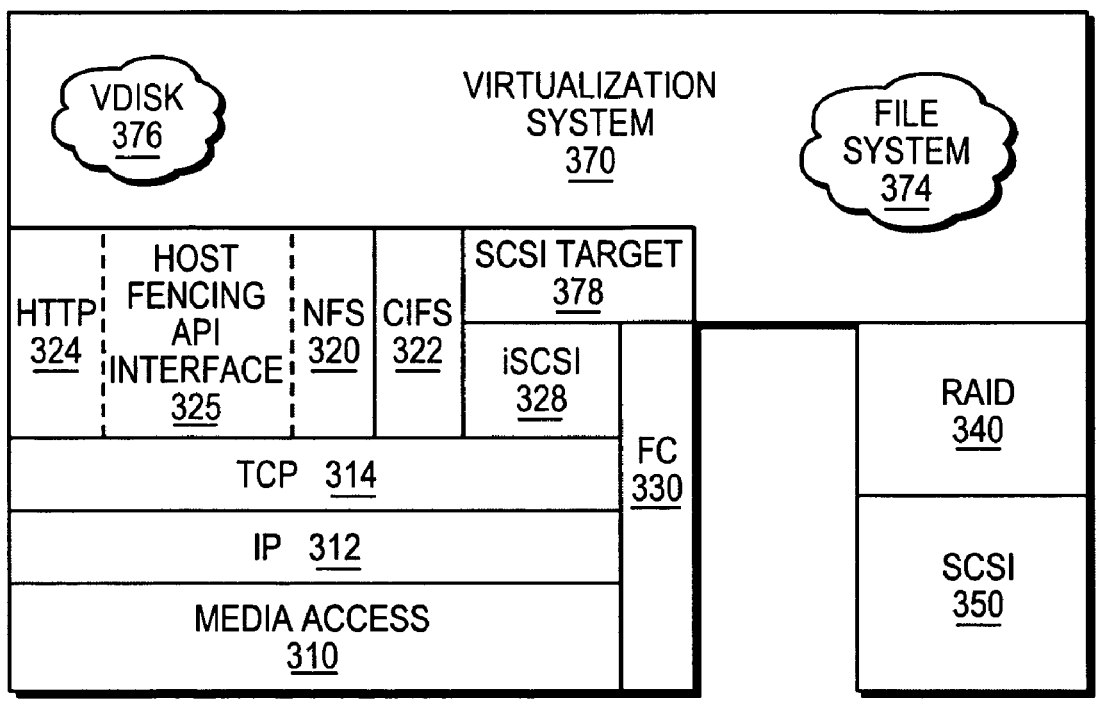
FIG. 3 is a schematic block diagram of a storage operating system that may be advantageously used in accordance with an embodiment of the present invention.

FIG. 3 is a schematic block diagram of a storage operating system 300 that may be advantageously used with embodiments of the present invention. The storage operating system 300 comprises a series of software layers organized to form an integrated network protocol stack or, more generally, a multi-protocol engine that provides data paths for clients to access information stored on the storage system 200 using block and file access protocols. The protocol stack includes a media access layer 310 of network drivers (e.g., gigabit Ethernet drivers) that interfaces to network protocol layers, such as the IP layer 312 and its supporting transport mechanisms, the TCP layer 314. A file system protocol layer provides multi-protocol file access and, to that end, includes support for the NFS protocol 320, the CIFS protocol 322 and the Hypertext Transfer Protocol (HTTP) protocol 324. As described further herein, the NFS protocol layer 320 is illustratively embodied as an NFS server.

An iSCSI driver layer 328 provides block protocol access over the TCP/IP network protocol layers, while a FC driver layer 330 operates with the network adapter to receive and transmit block access requests and responses to and from the storage system. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the storage system. In addition, the storage operating system includes a disk storage layer 340 that implements a disk storage protocol, such as a RAID protocol, and a disk driver layer 350 that implements a disk access protocol such as, e.g., a SCSI protocol.

Bridging the disk software layers with the integrated network protocol stack layers is a virtualization system 370. The virtualization system 370 includes a file system 374 interacting with virtualization modules illustratively embodied as, e.g., vdisk module 376 and SCSI target module 378. It should be noted that the vdisk module 376, the file system 374 and SCSI target module 378 can be implemented in software, hardware, firmware, or a combination thereof. The vdisk module 376 communicates with the file system 374 to enable access by administrative interfaces in response to a storage system administrator issuing commands to the storage system 200. In essence, the vdisk module 376 manages SAN deployments by, among other things, implementing a comprehensive set of vdisk (lun) commands issued by the storage system administrator. These vdisk commands are converted to primitive file system operations ("primitives") that interact with the file system 374 and the SCSI target module 378 to implement the vdisks.

The SCSI target module 378 initiates emulation of a disk or lun by providing a mapping procedure that translates luns into the special vdisk file types. The SCSI target module is illustratively disposed between the FC and iSCSI drivers 330, 328 and the file system 374 to thereby provide a translation layer of the virtualization system 370 between the SAN block (lun) space and the file system space, where luns are represented as vdisks 376. To that end, the SCSI target module 378 has a set of APIs that are based on the SCSI protocol and that enable a consistent interface to both the iSCSI and FC drivers 328, 330, respectively. By "disposing" SAN virtualization over the file system 374, the storage system 200 reverses the approaches taken by prior systems to thereby provide a single unified storage platform for essentially all storage access protocols.

The file system 374 provides volume management capabilities for use in block-based access to the information stored on the storage devices, such as disks. That is, in addition to providing file system semantics, such as naming of storage objects, the file system 374 provides functions normally associated with a volume manager. These functions include (i) aggregation of the disks, (ii) aggregation of storage bandwidth of the disks, and (iii) reliability guarantees, such as mirroring and/or parity (RAID), to thereby present one or more storage objects layered on the file system.

The file system 374 illustratively implements the WAFL® file system having an on-disk format representation that is block-based using, e.g., 4 kilobyte (KB) blocks and using inodes to describe files. The WAFL® file system uses files to store metadata describing the layout of its file system; these metadata files include, among others, an inode file. A file handle, i.e., an identifier that includes an inode number, is used to retrieve an inode from disk. A description of the structure of the file system, including on-disk inodes and the inode file, is provided in commonly owned U.S. Pat. No. 5,819,292, titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued Oct. 6, 1998, which patent is hereby incorporated by reference as though fully set forth herein.

It should be understood that the teachings of this invention can be employed in a hybrid system that includes several types of different storage environments such as the particular storage environment 100 of FIG. 1. The invention can be used by a storage system administrator that deploys a system implementing and controlling a plurality of satellite storage environments that, in turn, deploy thousands of drives in multiple networks that are geographically dispersed. Thus, the term "storage system" as used herein, should, therefore, be taken broadly to include such arrangements.

D. Server API for Modifying Export Access Rights

The present invention provides a clustered storage environment that includes a fencing mechanism that supports a file system protocol, such as the NFS protocol, as a shared data source in the host clustered environment. A plurality of nodes interconnected as a cluster is configured to utilize the storage services provided by an associated networked storage system. Each node in the cluster, hereinafter referred to as a "cluster member," is supervised and controlled by cluster software executing on one or more processors in the cluster member. In some instances, cluster membership is also controlled by an associated quorum device. The arrangement of the nodes in the cluster, and the cluster software executing on each of the nodes, as well as the quorum device, if any, are hereinafter collectively referred to as the "cluster infrastructure."

In accordance with illustrative embodiments of the invention, a server application program interface ("a Server API") provides an interface between the cluster infrastructure and an export module of the storage system to enable changes to access rights to certain exports of the storage system when the cluster infrastructure determines that a cluster member is to be fenced from a particular export of the storage system. More specifically, the NFS server of the storage system has associated therewith certain export lists that provide rules relating to access to the NFS data served by the storage system. An access rule provides the authentication level required for read access, read/write access and/or administrative (root) access by a client as identified by a particular identification type, such as a network address. For example, when processing an incoming data access request directed to the storage system, a search is performed through an ordered export list of rules in a rule set to find a match between the client and a specific rule in the export list. If no match is found, then the data access request is denied. If a match is found, then the matching rule indicates the permission rights that the particular client has, i.e., read-write access, or read-only access to the specified data container, which may be a file, a directory or a storage system. Individual cluster members that serve that client will typically have the same access rights initially as the client as a whole. However, using the fencing technique of the present invention, individual cluster members can be fenced off from the exports, but other cluster members interfaced with that client may still have access to the data.

According to illustrative embodiments of the present invention, when a change in cluster membership occurs, or is mandated for any one of a variety of reasons by the cluster infrastructure, a host API message is issued by a fencing program executing on a cluster member not affected by the change in cluster membership (i.e., the "surviving" cluster member). Details of a host API interface and API messages issued thereby are set forth in commonly owned U.S. patent application Ser. No. 11/187,781, of Erasani et al., for a CLIENT FAILURE FENCING MECHANISM FOR FENCING NETWORK FILE SYSTEM DATA IN A HOST-CLUSTER ENVIRONMENT, filed on even date herewith, which is hereby incorporated by reference herein as though fully set forth in its entirety.

The host API message notifies the Server API of the storage system that a modification must be made in one of the export lists. This modification is to be made so that a target cluster member, for example, cannot write to any of the disks in the storage system, thereby fencing off that member from that data. Thus, for example, the Server API of the storage system receives the host API message from a cluster member that a particular target cluster member is to be fenced. The message is forwarded to the Export Module of the NFS server. The Server API instructs the Export Module to change the read-write access permission right of a particular cluster member to a read only access as to one or more given exports to fence that cluster member from certain exports. In other instances, read-write permission is restored in an unfencing operation. A single host API message can be used for all requests for a particular storage system with the same user name and password. As a result, the multiple requests can be combined for fencing and unfencing operations and these operations do not have to be performed separately.

When a fencing operation is instituted in the storage system, the NFS server is suspended. Thus, NFS operations (read-write requests, file requests, etc.,) are locked. All pending NFS operations are completed before any new access permissions take effect. This allows the fencing operations to be atomic. The NFS file locks held by the fenced host are removed when the NFS server is suspended. After the new permission rights are applied, the NFS server is restarted in accordance with the fencing operation. However, when an unfencing operation is performed, there may be a necessity to recover locks.

The fenced cluster member may continue to have read access so that when it comes back online, the fenced member can read relevant storage devices in the storage system to bring the node up to date with the current state of the data in the storage system. After the fencing is no longer needed, i.e., when the node again becomes a member of the cluster (either through administrative action or the cluster framework implementation), an "unfence" operation can be performed to allow access to the relevant data.

Figure 4:
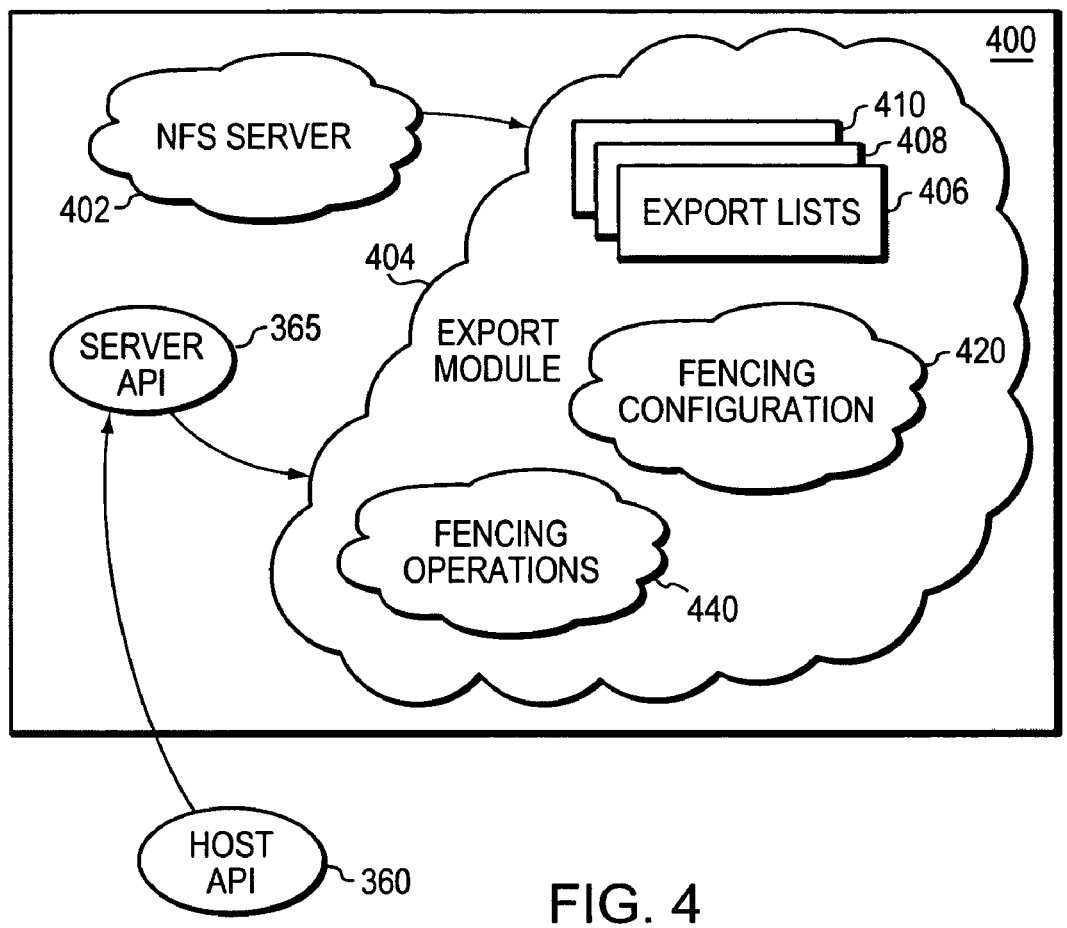
FIG. 4 is a schematic block diagram illustrating the NFS layer including the NFS server and export module, which can be advantageously employed in the storage system in accordance with an embodiment of the present invention.

FIG. 4 depicts a schematic software process arrangement 400 embodying the NFS layer 320 (FIG. 3) that includes an NFS server 402 that communicates with an export module 404 (residing in the memory 224 of the storage system 200.) The export module 404 contains NFS export lists 406, 408 and 410, which are also referred to herein as "NFS exports." The NFS export lists set forth permission rights regarding the read-write access and/or read-only access of cluster members (as identified by their respective IP addresses or hostnames) with respect to certain data in files and/or directories of the storage system. The restriction can also apply to an entire storage system. The storage system, and in particular the export module 404, are initially configured to support the fencing program running on the cluster members.

Briefly, upon initial set up and configuration, export configuration module 420 specifies whether a cluster member which is identified by its IP address has read-write access, or read only access with respect to particular directories or files. When initially configuring the list, read only permission is illustratively identified by an '-ro=' entry, which means that the cluster member identified after the -ro=has read only permission to files, directories, and/or storage systems specified. A cluster member that is granted read-write access, indicated by '-rw=' means the identified cluster member has read-write access to the files, directories, and/or storage systems specified. In addition, administrative (root) access can be granted to cluster members if desired in a particular application of the invention.

Figure 5:
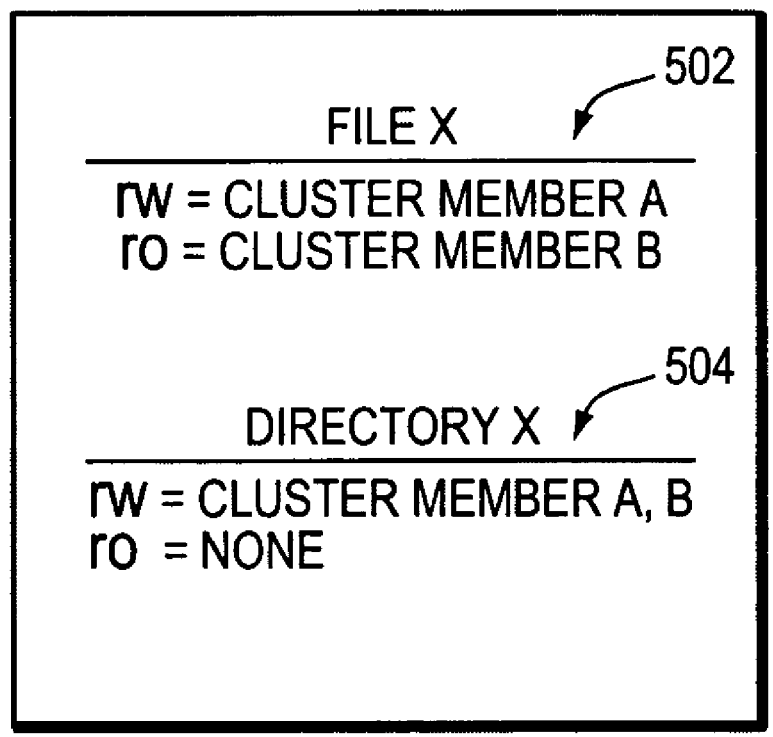
FIG. 5 is a schematic block diagram illustrating the format of an exemplary export list in accordance with an embodiment of the present invention.

An example of a set of export lists 500 is schematically illustrated in FIG. 5. The export list 502 is a list of cluster members that have either read-write permission, or read-only permission to File X. Though not shown in the schematic illustration of FIG. 5, the cluster members can be identified by any one of their respective IP addresses, hostnames netgroups and the like. Typically, a cluster member is addressed by either its IP address or host name. The export list 504 is a list of cluster members that have either read-write permission or read-only permission to Directory X, for example. For additional protection, a constraint may also be included whereby an IP address appears on one of the lists or otherwise is considered a non-valid address and access is restricted completely for that particular IP address.

In order to implement a fencing operation procedure of the present invention, the cluster 120 is initially configured in a way such that certain members have read-write permission and other members have read only permission to certain data. In an illustrative embodiment of the invention, all cluster members will typically be specifically granted read-write access, and then if a cluster member is to be fenced, its access permission right as to given exports is changed to read only. An initial configuration is schematically illustrated by the export configuration module 420 (FIG. 4). The initial configuration can be illustratively accomplished using a configuration file.

Briefly, in accordance with the present invention, a server side API is provided to fence external hosts (cluster members) from NFS exports in response to a request to do so that is received from a surviving cluster member. That request is sent from the surviving cluster member as a host fencing API. The present invention relates to a server-side API which takes the host side API message and converts it into routines that actually accomplish the task of manipulating export rules to fence or unfence the specified nodes from the given export.

More specifically, as noted herein, the types of access of interest for purposes of fencing are read-write and read-only. These types of access are defined in the export lists with '-rw=' and '-ro=' tags for an export. For example, a read-write access to host X and a read-only access to host Y for an export of /vol/volA can be represented as the following:

/vol/volA< >-rw=x, ro=y.

In a clustered deployment, the cluster members, which may be referred to herein as a host that in turn serves a cluster member, may be allowed write access to NFS data (also referred to herein as an NFS exports). For example, initially, a set of cluster members, cluster member1 through cluster memberN are allowed access to an export as follows:

/vol/volX< >-rw=cluster member1:cluster member2 . . . cluster memberN.

When cluster membership changes, as discussed herein, the cluster infrastructure determines whether a cluster member should now be fenced from certain exports. For example, in a deployment that includes a quorum device, one of the cluster members will typically attempt to assert a claim on the quorum device, upon detecting a failure or absence of a heart beat from other cluster members. The cluster member that attains the claim on the quorum device is referred to herein as "the cluster quorum member." In accordance with this aspect of the invention, the cluster quorum member determines that a particular cluster member is restricted access to certain exports. Thus, the cluster quorum member can decide to deny that failed cluster member the ability to write changes to the data. When the cluster infrastructure of a particular implementation of the invention determines that a fencing operation is to occur, a host API message 360 is sent to the server API 365 of the present invention. As noted, further details regarding the host API and messaging thereby are provided in the above-incorporated U.S. patent application Ser. No. 11/187,781.

In accordance with the present invention, an interface is provided via server API 365 that accomplishes the denial of ability to write to the export when a fencing operation is requested by the host side of the environment.

It is noted that in accordance with the present invention, it is not the storage system that determines read-write access, instead it is the cluster infrastructure, which may include an external voting body through a quorum device as described previously, which determines that a former cluster member is to be fenced off or unfenced. Typically, the voting body via the quorum disk involves a cluster membership algorithm as will be understood by those skilled in the art.

In accordance with one aspect of the invention, the server API 365 utilizes the following function call to interface with the export module 404:

Fence Enable(all-pathnames, export-hostnames[ ], export-pathnames[ ], persistent)

The "all-pathnames" entry, if true, operates to fence all exports of the storage system. Thus every cluster member is fenced from all the given exports of the storage system. The second input is the "export-hostnames" entry which specifies export hostnames as an array of host names (i.e. cluster members) which are to be fenced off. The next input name, "export-pathnames" is a fenced-paths entry, and it provides an array of specific export paths that are to be fenced off. The final input is a "persistent" value, which, if set to true, modifies the exports file to append the rule as a permanent change. Thus, the new export rules are effective across a storage system crash. If it is set to false, the change is made to exports in memory, but it is not permanent.

Thus, this API is used for fencing exports for a given entry. In other words, the entry will not have write permission as to those exports. As noted previously, the rule change takes effect immediately, however, when a cluster member is being fenced, care is taken that all NFS operations are completed prior to changing the fencing configuration of the cluster, as described in further detail hereinafter.

In accordance with the present invention, the function call for the unfencing operations is as follows:

Fence Disable(all pathnames, export-hostnames[ ], export-pathnames[ ], persistent)

In the Fence Disable command, the "all pathnames" input is a Boolean optional value in which the default value is false. If it is set to true, then this operates to unfence all export rules of the storage system. If it is set to true, then the export-pathnames[ ] option must be left empty. The next input is the fenced host input "export-hostnames[ ]" which is an array of hostnames which are to be fenced off. The fenced paths entry "export-pathnames[ ]" is an array of paths which are to be fenced off. As noted, this should be left empty if all rules are to be unfenced. The persistent entry is a Boolean optional value having a false default value. If it is set to true, then this modifies the exports file to append the rule for a permanent change. Thus, the new export rules are effective across a storage system crash. If it is set to false, the exports are only changed in memory.

By way of example, the Server API 365 interfaces with the export module using the following command line which is sent to the export module 404:

Fence Enable(/vol/volX -rw=cluster member1:cluster member3 . . . cluster memberN, ro=cluster member 2)

Thus, cluster member 1 and cluster member 3 retain read write access to the pathnames stated, namely, directory /vol/volX, but the access permission rights of cluster member 2 are thereby changed to "read only" for that pathname. If the cluster membership decides that cluster member 2 can later be trusted due to a change in the conditions or in cluster membership, the cluster member can then again use API calls to re-grant write permissions. This operation is also referred to herein as "unfencing."

Figure 6:
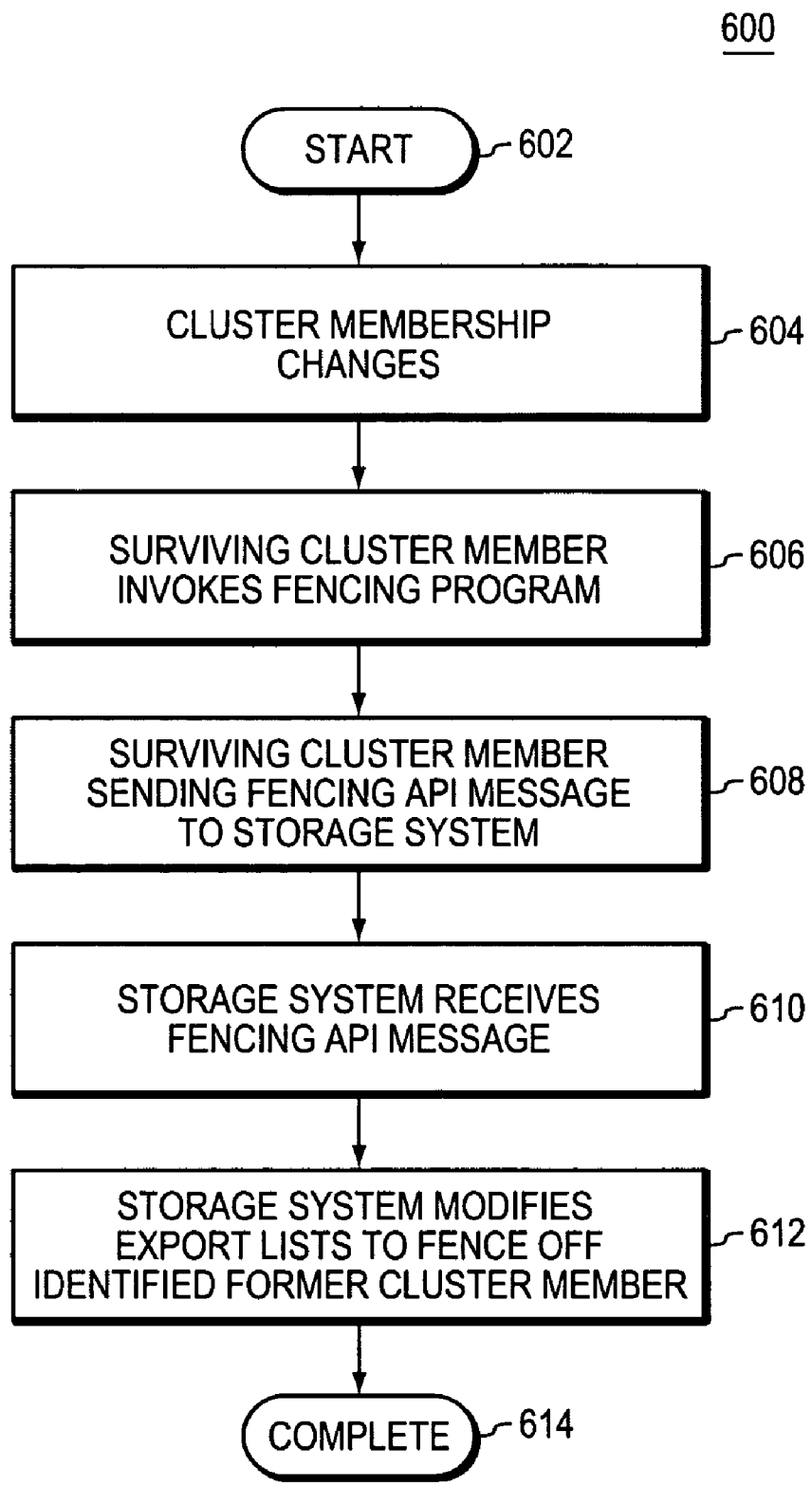
FIG. 6 is a flow chart detailing the steps of a procedure for performing a fencing mechanism in accordance with the present invention.

Using this Server API, as well as the host fencing API, which is described in detail in the above cited U.S. patent application Ser. No. 11/187,781 the fencing and unfencing operations are performed in accordance with the present invention. These operations can be further understood with reference to the flow chart of FIG. 6, which illustrates a procedure 600 that summarizes in broad terms, the steps of fencing technique of the present invention. The procedure 600 begins with the start step 602 and continues to step 604 in which it is detected that the cluster membership in an established cluster has changed. For example, one of the clusters in the cluster 120 of FIG. 1 may have failed, or alternatively, a new node could be added as a cluster member to the cluster 120 or the communications over link 170 between the clusters may have failed. In any of these circumstances, the cluster software detects that cluster membership has changed, or an administrator has notified the system of the change in cluster membership, in accordance with step 604.

In step 606, a surviving cluster member, such as the cluster member 130*a*, initiates the fence program 136*a* of the present invention. In step 608, the surviving cluster member transmits a host fencing API message over the network 160 to the storage system 200, where it is received by the storage system 200 in step 610 and passed to the Server API 365 in the NFS layer. As a result, the Server API 365 (FIG. 4) instructs the export module 404 to modify the export lists 406 through 410 to fence off the identified former cluster member 130*b*, for example, as illustrated in step 612. Once the failed cluster member has been fenced off, operations continue with the surviving cluster member 130*a* and the procedure 600 completes in accordance with step 614.

Figure 7:
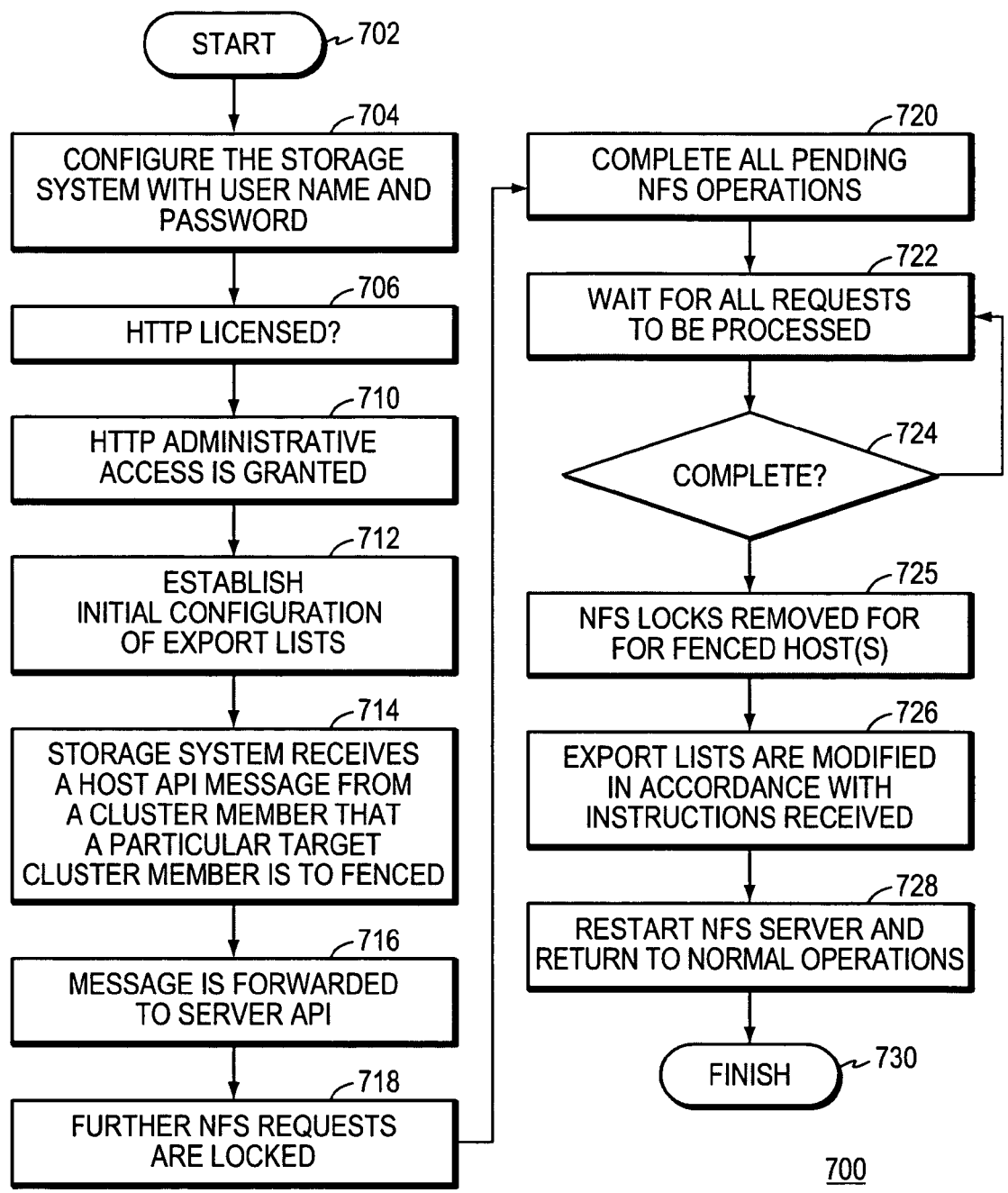
FIG. 7 is a flow chart detailing a procedure for implementing the server API functions in accordance with illustrative embodiments of the present invention.

FIG. 7 is a flow chart of a procedure 700 set forth in accordance with the present invention. The procedure begins with the start step 702 and continues to step 704. Step 704 involves configuration of the storage system including authentication of the user name and password. In accordance with step 706, the system ascertains that there is an appropriate HTTP license because the fencing message is encapsulated in HTTP and sent over the TCP/IP network.

In step 710, the storage system must have HTTP administrative access allowed in order for the fencing operations of the present invention to perform properly. Therefore, the appropriate administrative access must be allowed on the storage system in accordance with step 710. In accordance with step 712, the initial configuration regarding the export lists are established. As mentioned previously, the exports that are being considered as targets for fencing/unfencing are explicitly set with the '-rw=' permissions. As noted previously, it is preferable that the wild cards -rw and -ro options are not used.

Upon completion of step 712, the storage system is now fully configured. Each cluster member has had the appropriate software loaded into its respective cluster software memory to generate and issue the host API for the fencing/unfencing operations. In step 714, the storage system receives a host API message from a cluster member that a particular target cluster member is to be fenced. The message is forwarded to the Server API 365 in step 716. Prior to the fencing operation taking effect, NFS operations (read-write requests, file requests, etc.,) are locked in step 718. All pending NFS operations are completed before new access permissions take effect pursuant to the fencing or unfencing operations, as shown in step 720. This allows the fencing operations of the present invention to be atomic.

Step 722 indicates that a period elapses while the system waits for all requests to be processed. In decision step 724, a determination is made as to whether the NFS requests have been drained. If all requests have not been drained (i.e., processed), the procedure returns to step 722 where the system waits until that process is complete. If, instead, the process of draining all NFS requests is complete, the YES path is followed to step 725 where the NFS file locks held by the NFS client hosts are removed and then followed by step 726, where the export lists are modified using the server API described above per the received command, in accordance with the invention. It is noted that a single API can be used for all requests for a particular storage system with the same user name and password. Thus, they can be combined for the fencing and unfencing operations and do not have to be performed separately.

It should be understood by those skilled in the art that the exports can use any one of the respective IP addresses, hostnames, netgroups and the like of the cluster members. Typically, either host names or IP addresses are provided in the read-write and read-only access lists. If a host name is specified in the exports list, then the NFS server does a reverse name look up for each incoming NFS request. As long as the IP address is resolved to the host name mentioned in the exports line, the access control checks are correctly enforced. This depends on how the storage systems and cluster members are configured with respect to the name resolvers. Both sides of the system may have the same name resolvers for consistencies sake, however, it is within the scope of the present invention that either the host name or IP addresses can be used to perform the read-write permission changes. However, it should be understood that the scope of the invention encompasses usage of any one or more of the above-identified identifications for the cluster members, and combinations thereof.

At step 728, there is a restart of the NFS server and a return to normal operations with the new fencing now in effect. The procedure thus completes at step 730.

It should be understood that the server API and any error messages that may be utilized in an actual implementation of the invention may be written, modified or expanded upon or written in a different software language, or in a code with different semantics or of a different format while remaining within the scope of the present invention.

It should be understood that the present invention allows external cluster members to be fenced off from shared NFS data atomically, using simple APIs in a host clustering environment. This enables the usage of NFS as a shared data source in clustering deployments where maintaining data consistency is a primary requirement apart from availability. However, previously in host clustering environments, directly attached storage had been used. A further advantage is that the techniques of the present invention give a proper migration path to clustering customers who adopt networked storage appliances and do not want to use direct attached storage for shared data. Another advantage is that the code is tightly integrated with the NFS stack and thus is easily implemented.

Thus, the invention provides a simplified API for fencing cluster members, which is easily portable across all Unix®-based storage/server system platforms. In addition, the invention can be implemented and used over TCP with insured reliability. The invention also provides a means to fence cluster members and enables the use of NFS in a shared collaborative clustering environment. It should be noted that while the present invention has been written in terms of files and directories, the present invention may be utilized to fence/unfence any form of networked data containers associated with a storage system. It should be further noted that the system of the present invention facilitates implementation of a simple and complete user interface that can be plugged into a host cluster framework which can accommodate different types of shared data containers, as described in the above-incorporated, commonly-owned U.S. patent application Ser. No. 11/187,781, of Erasani et al., for a CLIENT FAILURE FENCING MECHANISM FOR FENCING NETWORK FILE SYSTEM DATA IN A HOST-CLUSTER ENVIRONMENT, filed on even date herewith. Furthermore, the system and method of the present invention supports NFS as a shared data source in a high-availability environment that includes one or more storage system clusters and one or more host clusters having end-to-end availability in mission-critical deployments having substantially constant availability.

The foregoing has been a detailed description of the invention. Various modifications and additions can be made without departing from the spirit and scope of the invention. Furthermore, it is expressly contemplated that the various processes, layers, modules and utilities shown and described according to this invention can be implemented as software, consisting of a computer readable medium including programmed instructions executing on a computer, as hardware or firmware using state machines and the like, or as a combination of hardware, software and firmware. Accordingly, this description is meant to be taken only by way of example and not to otherwise limit the scope of the invention.

What is claimed is:

1. A method of performing a fencing operation on exports of one or more storage systems in a clustered environment, comprising:

initially configuring export lists in the one or more storage systems such that one or more cluster members of an associated cluster have either read write access or read only access to at least one given export of at least one of the one or more storage systems;

receiving a message from one or more cluster members that one or more other cluster members are to be fenced off from the at least one given export;

in response to receiving the message from the one or more cluster members that the one or more other cluster members are to be fenced off from the at least one given export, stopping further incoming file system operations;

processing any pending file system operations;

removing any locks of a fenced host;

modifying, in response to receiving the message, one or more other cluster members from read-write access to read-only access by the one or more storage systems in at least one export list; and restarting the file system operations using the modified at least one export list.

2. The method as defined in claim 1 wherein the at least one given export is a Network File System export.

3. The method as defined in claim 1 further comprising initially configuring the at least one export list in the one or more storage systems such that the one or more cluster members of an associated cluster have either read/write access to the at least one given export of the one or more storage systems.

4. The method as defined in claim 1 further comprising receiving an application program interface message from the one or more cluster members via HyperText Transfer Protocol over Transmission Control Protocol/Internet Protocol.

5. The method as defined in claim 1 further comprising verifying that the message identifies a correct storage system name.

6. The method as defined in claim 5 further comprising verifying that the message includes correct password information for the correct storage system name and that an administrator sending the message is privileged to access the correct storage system name.

7. The method as defined in claim 1 further comprising checking a correct export path in the message.

8. The method as defined in claim 1 further comprising checking whether the at least one export list related to the one or more storage systems contain one or more wildcard entries.

9. The method as defined in claim 8 further comprising issuing an error message to an administrator if it is determined that the one or more wildcard entries are contained in the at least one export list related to the one or more storage systems.

10. A system for performing fencing operations in a storage system environment, comprising:

one or more storage systems coupled to one or more clusters of interconnected cluster members to provide storage services for one or more clients, the one or more storage systems having at least one export list containing rules regarding access permission rights for specified cluster members associated with at least one specified storage device connected to the one or more storage systems, files and directories stored therein on the at least one specified storage device, the one or more storage systems being programmed with a fencing application program interface such that when a host-side application program interface message is received from one or more of the cluster members to the one or more storage systems to fence one or more particular cluster members off from the at least one given export, then the storage system stops further incoming file system operations, processes any pending file system operations, removes any locks of a fenced host, modifies the at least one export list to change access permission rights of at least one of one or more cluster member from read write access to read only access, and restarts the file system operations using the modified at least one export list.

11. The system as defined in claim 10 wherein the one or more storage systems are coupled to the one or more clusters by way of one or more networks.

12. The system as defined in claim 10 wherein the one or more storage systems include a Network File System server that uses at least one Network File System export list that contain rules regarding access permission rights to data of the one or more storage system that is shared by the one or more cluster member.

13. The system as defined in claim 10 wherein the one or more storage systems is initially configured with the at least one export list that sets forth read-only and/or read/write access permissions for each of the one or more cluster members of the one or more clusters that is interfaced with the one or more storage systems with respect to at least part of an entire storage system, data of the at least part of the entire storage system, and a directory of at least part of the entire storage system.

14. The system as defined in claim 10 wherein the at least one export list further comprises administrative root access information for the one or more cluster members interfaced with the one or more storage systems.

15. A computer readable medium for performing failure fencing in a clustered environment with networked storage, including program instructions for performing the steps of:

initially configuring at least one export list in one or more storage systems such that one or more cluster members of an associated cluster have either read write access or read only access to at least one given export of at least one of the one or more storage systems;

receiving a message from the one or more cluster members that one or more other cluster members are to be fenced off from the at least one given export;

in response to receiving the message from the one or more cluster members that the one or more other cluster members are to be fenced off from the at least one given export, stopping further incoming file system operations;

processing any pending file system operations;

removing any locks of a fenced host;

modifying, in response to receiving the message, one or more cluster member that the one or more cluster members from read-write access to read only access by the one or more storage systems in at least one export list; and restarting the file system operations using the modified at least one export list.

16. The computer readable medium for performing failure fencing as defined in claim 15 further comprising program instructions for sending at least one application program interface message that provides the modifying to access permission rights of the initially configured at least one export list to an export module in the one or more storage systems.

17. The computer readable medium as defined in claim 15 further comprising program instructions for stopping further incoming Network File System operations and processing at least some pending Network File System operations, in response to receiving the application program interface message from the one or more cluster members that the one or more other cluster members are to be fenced off from at least one given export.

18. The computer readable medium as defined in claim 17 further comprising program instructions for performing the modifying of the at least one exports list, and restarting Network File System operations.

19. The computer readable medium as defined in claim 15 further comprising program instructions for initially configuring the one or more storage systems such that the one or more cluster members have read write access to at least some of the at least one export lists and modifying the at least one export list by changing read/write access to read only access.

20. A storage system for performing fencing operations in a storage system environment, comprising:

means for initially configuring export lists in the storage system such that one or more cluster members of an associated cluster infrastructure have either read write access or read only access to at least one given export of the storage system in the storage system environment;

means for receiving at the storage system when it is determined by the associated cluster infrastructure that one or more other cluster members are to be fenced off from at least one given export;

in response to receiving the message from the one or more cluster members that the one or more other cluster members are to be fenced off from the at least one given export, means for stopping further incoming file system operations;

means for processing any pending file system operations;

means for removing any locks of a fenced host;

means for modifying, in response to receiving the message, one or more cluster members from read-write access to read-only access in at least one export list; and means for restarting the file system operations using the modified at least one export list.

21. A storage system, comprising:
a server coupled to a plurality of cluster members, wherein each cluster member is controlled by one or more processors within the cluster member;
an export list configured to contain access permission rights for the cluster members;
the cluster members configured to send and receive messages to the server containing changes to the access permission rights; and
the server further configured to receive the messages from the cluster members, to stop further incoming file system operations, to process any pending file system operations, to remove any locks of a fenced host, to modify the export list stored within the server to contain updated access permission rights for the cluster members by fencing a first cluster member by changing the first cluster member's access from read-write access to read only access and by unfencing a second cluster member by changing the second cluster member's access from read only access to read-write access, and to restart the file system operations using the modified at least one export list.

22. A method, comprising:
associating a first cluster member with at least one export in a storage system, wherein the storage system is connected with a plurality of cluster members, wherein each cluster member is controlled by one or more processors;
storing an export list in the storage system, wherein the export list is associated with the export;
sending a message from the first cluster member to the storage system;
receiving, by the storage system, the message from the first cluster member to fence a second cluster member;
in response to receiving the message from the first cluster members that the second cluster member is to be fenced off from the export, stopping further incoming file system operations;
processing any pending file system operations;
removing any locks of a fenced host;
changing, in response to the storage system receiving the message the second cluster member's read-write access to read only access stored within the export list to create a modified export list; and
restarting the file system operations using the modified export list.

23. A system, comprising:
a plurality of cluster members coupled to a storage system, wherein each cluster member is controlled by one or more processors within the cluster member; and
the storage system configured to create an export list, wherein the export list contains read write access or read only access of the plurality of cluster members to exports of the storage system, and in response to receiving a message from a first cluster member to change access of a second cluster member from read write access to read only access, the storage system is further configured to stop further incoming file system operations, to process any pending file system operations, to removing any locks the second cluster member, to change the second cluster member's read-write access to read only access stored within the export list to create a modified export list, and to restart the file system operations using the modified export list.

24. A method, comprising:
initially configuring an export list in a server such a plurality of cluster members of an associated cluster have read write access an export the server, wherein the export list is a data structure stored within the server and contains rules regarding access permission rights to data of the server;
receiving a message from a first cluster members that a second cluster member is to be fenced off from the export;
in response to receiving the message from the first cluster members that the second cluster member is to be fenced off from the export, stopping further incoming file system operations;
processing, by the server, any pending file system operations received prior to the message;
Removing, by the server, any locks of a fenced host;
modifying, by the server, in response to receiving the message, the export list to change the second's cluster member access from read-write access to read-only access; and
restarting the file system operations using the modified export list.

* * * * *

UNITED STATES PATENT AND TRADEMARK OFFICE
CERTIFICATE OF CORRECTION

| | | |
|---|---|---|
| PATENT NO. | : 7,516,285 B1 | Page 1 of 1 |
| APPLICATION NO. | : 11/187649 | |
| DATED | : April 7, 2009 | |
| INVENTOR(S) | : Thomas Haynes | |

It is certified that error appears in the above-identified patent and that said Letters Patent is hereby corrected as shown below:

In Col. 18, line 26 should read:
Claim 17. The computer readable medium as defined in claim ~~15~~ 16

In Col. 18, line 51 should read:
Claim 20. the storage ~~system~~ systems in the storage system environment;

Signed and Sealed this
Twenty-ninth Day of May, 2012

David J. Kappos
*Director of the United States Patent and Trademark Office*